United States Patent

[11] 3,601,120

| [72] | Inventor | Harold Lee Massie<br>Trenton, N.J. |
|---|---|---|
| [21] | Appl. No. | 815,724 |
| [22] | Filed | Apr. 14, 1969 |
| [45] | Patented | Aug. 24, 1971 |
| [73] | Assignee | Hoffmann-LaRoche Inc.<br>Nutley, N.J. |

[54] ULTRASONIC DOPPLER BODY SURFACE MOVEMENT DETECTOR
4 Claims, 3 Drawing Figs.

[52] U.S. Cl. .................................................... 128/2.05 S
[51] Int. Cl. ........................................................ A61b 5/02
[50] Field of Search ............................................ 128/2.05 A,
2.05 R, 2.05 V, 2.05 S, 2.06 AR

[56] References Cited
UNITED STATES PATENTS

| 2,918,054 | 12/1959 | Goolkasian .................. | 128/2.05 T |
| 2,946,645 | 7/1960 | Schwarzer ..................... | 128/2.05 S |
| 3,229,685 | 1/1966 | Ringkamp et al. ............. | 128/2.05 |

OTHER REFERENCES
Satomura, " Journal of the Acoustical Society of America," Vol. 29, No. 11, Nov. 1957, pp. 1185 128-2.05 R

*Primary Examiner*—William E. Kamm
*Attorneys*—Samuel L. Welt, Jon S. Saxe, Bernard S. Leon and Jacob Frank ABSTRACT: A device for utilization with an ultrasonic system for internal exploration of living organisms, enabling improved measurement of low blood pressure values by audible monitoring including modulating an audible tone frequency with the signals to be detected to generate a distinct audible signal rhythm which can directly be detected by human ear and distinguished from noise.

PATENTED AUG 24 1971 3,601,120
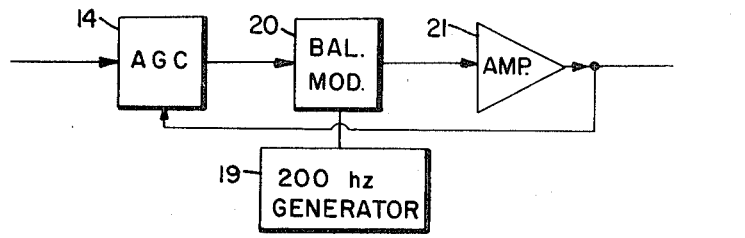
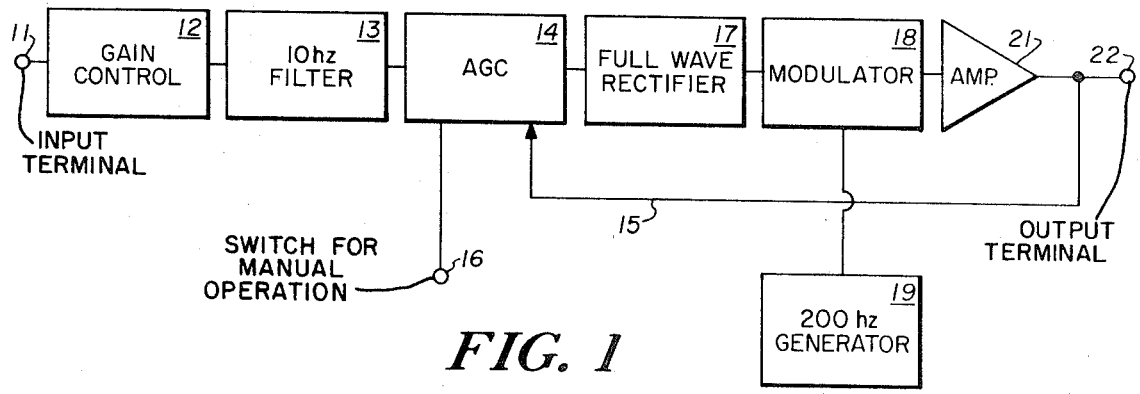
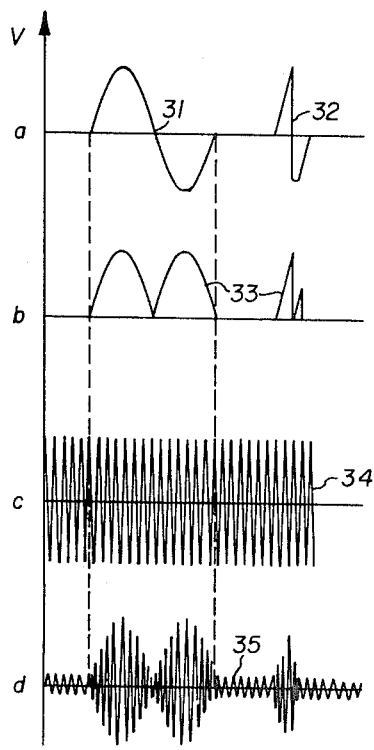

ULTRASONIC DOPPLER BODY SURFACE MOVEMENT DETECTOR

BACKGROUND OF THE INVENTION

1. Field of the Invention

This invention relates broadly to devices for transforming a given frequency into a higher frequency and more specifically to those which include amplitude modulators.

2. Description of the Prior Art

The present invention is mainly directed for use with ultrasonic systems for exploration of internal functions in living organisms. In this connection a method for indirect blood pressure measurement is known according to which the opening and closing movement of an artery wall under external pressure application, is detected by sensing the signals resulting from the doppler shift between an ultrasonic signal transmitted to the artery section under pressure and the signal reflected by the moving artery wall.

Normally the doppler signals are detected and evaluated automatically. However, when the arterial wall moves relatively slow the blood pressure values to be measured are very low and the doppler signals are in a frequency range where artifact signals disturb the automatic detection.

In contrast with an automatic evaluation system, the human ear is able to distinguish rhythmical sound pattern from random artifact signals. Accordingly, it would be possible to detect the doppler signals by ear provided that they are delivered in an audible form. With respect to the blood pressure device discussed above, this would mean that the doppler signals, which for very low blood pressure values may be below the frequency limit of audibility, must be converted into signals with a conveniently audible frequency.

SUMMARY

The purpose of the present invention, therefore, is to provide a device for converting signals, having a frequency in the range of or below the limit of audibility, into signals with a distinct audible frequency. This is accomplished by employing a modulating unit in which a distinct audible frequency is modulated by the doppler signal and proper gain control enabling a rhythmical pattern of heart pulses to be detected from the resulting signals and distinguished from noise.

Other objects, advantages and capabilities of the present invention will become apparent from the following detailed description, taken in conjunction with the accompanying drawing showing only a preferred embodiment of the invention.

BRIEF DESCRIPTION OF THE DRAWING

In the drawing:

FIG. 1 is a block diagram showing the arrangement of the components of the device according to the invention.

FIG. 2 is a waveform diagram showing the voltage characteristic at different interconnection points modulator the device according to the invention.

FIG. 3 is a partial block diagram showing an alternative arrangement using a balanced modulator.

DESCRIPTION OF THE PREFERRED EMBODIMENT

Referring to the drawing, there is shown in FIG. 1 a preferred embodiment of the invention, wherein a low frequency input signal, which may be from discriminator output is applied, via input terminal 11 to a gain control unit 12 mainly comprising a potentiometer allowing for adjustment of the noise level. The output of gain control unit 12 is connected to a 10 Hz. filter 13 which serves to offset any low frequency base line drift. Coupled from the output of filter 12 is an automatic gain control (AGC) unit 14 having a feedback line 15 connected from an output terminal 22, and an input 16 such as a switch for manually activating the AGC operation which is otherwise inhibited. The AGC unit 14 is followed by full wave rectifier 17 the output of which is coupled with the input of a modulator unit 18. Also connected to modulator 18 is an oscillator 19, which in the present embodiment is shown to generate a continuous 200 Hz. sinusoidal signal. The modulator output is connected through an amplifier 21 to the output terminal 22 which may be connected with a pair of earphones or a loudspeaker.

OPERATION

For convenience, the operation of the above embodiment will be described in connection with an ultrasonic blood pressure measuring system of the type heretofore discussed. In such a case the signal applied to input terminal 11 will be from a discriminator detecting the doppler signal which is representative of the rate of modulation of the transmitted carrier frequency by movement of the arterial wall surface. Any frequency of such signal can be processed by the present invention but the main advantages are best seen when regarding the area below the limit of audibility. For example, at low blood pressures (below 60 or 70 mm.) the frequency of these doppler signals, when using a carrier frequency of approximately 2 megacycles, are in the 10 to 20 Hz. region which the ear cannot hear and/or distinguish from artifact.

In use the operator may employ a pair of earphones or a speaker by connection with output terminal 22. Then by means of gain control unit 12 random noise is adjusted to barely audible level. The artery of the patient to be diagnosed is totally occluded by external pressure (cuff) so that no signals due to arterial wall movement but only random artifact signals occur at the input of the device. As the external cuff pressure is decreased there will be received at the patient's systolic point the first signals in response to the arterial wall movement.

These signals applied to input terminal 11 from the doppler discriminator are shown in FIG. 2a as a series of 20 Hz. signals 31 and random artifact signals 32. By way of the 10 Hz. filter 13 all frequencies below 10 Hz. are removed to avoid any base line drift. The signals are then fed into the AGC unit 14 which only after manually activated through input 16, limits the signal amplitude to a predetermined level. After full wave rectification the resulting signal 33, depicted at FIG. 2b, is fed into modulator 18 where it modulates the 200 Hz. generator frequency 34. Prior to implementing the device, the amplitude of the continuous 200 Hz. signal, indicated in FIG. 2c, should be adjusted to a level which, in the absence of input signals, is just audibly discernable to, in effect, establish a suppressed carrier output. The modulation product detected at input terminal 22 is shown by 35 in FIG. 2d.

The signals then obtained are such that enable the operator to recognize the rhythmical patterns of the occurring heart pulse signals after having received three to four pulses, and readily distinguish them from noise. Since the audio signals heard are related with movement of the arterial wall blood pressure values may now be readily ascertained by the listening operator while observing the manometer reading during a blood pressure cycle. Once the operator has detected the systolic pulses, the manual switch 16 is operated to activate AGC 14 in order to avoid overdriving which would result from increasing intensity of subsequent signals.

Of course, it is apparent that any suitable frequency in the audio zone in lieu of 200 Hz., could be generated by oscillator 19 and utilized in the present invention. Another variation of this invention might call for a balanced modulator 20 shown in FIG. 3, which obviates the need of the full wave rectifier for suppressed carrier modulation. Clearly this is so because modulator 18 acts as an attenuator controlled by the output of the full wave rectifier 17 which output signal only appears at the modulator output as the attenuation effect on the carrier. Since this suppression function is similar to that of the balanced modulator, the latter may be readily employed as a substitute for full wave rectifier 17 and modulator 18, as noted above.

I claim:

1. In a system for audibly indicating the movement of surfaces in living organisms by emitting ultrasonic energy and receiving the ultrasonic doppler energy reflected from a moving surface and detecting from the reflected ultrasonic energy electrical doppler signals containing amplitude information and frequency information representative of said surface movement, the combination comprising filter means for receiving said doppler signals to avoid low frequency base line drift, frequency generating means for providing an audio frequency carrier having a higher frequency than said detected doppler signals suppressed carrier modulating means connected from said filter means and provided with said audio frequency carrier to modulate said audio frequency carrier with said doppler signals for generating a distinct rhythmical audio frequency burst pattern which has effectively the same amplitude and is directly related in frequency to said detected doppler signals.

2. The combination according to claim 1 wherein said suppressed carrier modulating means includes a balanced modulator.

3. The combination according to claim 1 wherein said suppressed carrier modulating mans includes:

a modulator unit, full wave rectification means connected to said modulation unit.

4. The combination according to claim 3 wherein said means for generating said pattern further comprises gain control means connected with said filter means to set the noise level of the incoming signals, automatic gain control means connected from said filter means and to said rectification means to maintain constant signal level, amplifying means connected from said modulating means for providing an output signal, and feedback mans connecting the output of said amplifying means to said automatic gain control means.